United States Patent [19]

Weisbrich

[11] 4,288,199

[45] Sep. 8, 1981

[54] TARP YAW TRACK MEANS FOR ROTORS

[76] Inventor: Alfred L. Weisbrich, 76 Mayflower Rd., Windsor, Conn. 06095

[21] Appl. No.: 971,924

[22] Filed: Dec. 21, 1978

Related U.S. Application Data

[63] Continuation-in-part of Ser. No. 763,936, Feb. 25, 1977, Pat. No. 4,156,579.

[51] Int. Cl.³ .............................................. F03D 3/04
[52] U.S. Cl. .................................... 415/2 R; 416/121; 415/3
[58] Field of Search ........................ 415/2-4; 416/121 A, DIG. 6

[56] References Cited

U.S. PATENT DOCUMENTS

| | | | |
|---|---|---|---|
| 1,936,233 | 11/1933 | Groves | 415/4 |
| 1,963,912 | 6/1934 | Honnef | 416/121 A |
| 4,021,140 | 5/1977 | Weisbrich | 416/142 X |
| 4,045,144 | 8/1977 | Loth | 415/2 A |
| 4,047,832 | 9/1977 | Sforza | 415/2 A |
| 4,068,132 | 1/1978 | Bardekoff | 416/121 A X |
| 4,079,264 | 3/1978 | Cohen | 415/2 R X |
| 4,156,579 | 5/1979 | Weisbrich | 415/2 A |

FOREIGN PATENT DOCUMENTS

| | | | |
|---|---|---|---|
| 359555 | 9/1922 | Fed. Rep. of Germany | 416/121 A |
| 595497 | 4/1934 | Fed. Rep. of Germany | 415/2 A |
| 605673 | 8/1935 | Fed. Rep. of Germany | 416/121 A |
| 672606 | 3/1939 | Fed. Rep. of Germany | 416/121 A |
| 2620862 | 11/1977 | Fed. Rep. of Germany | 416/121 A |
| Ad.59852 | 8/1954 | France | 415/2 A |

*Primary Examiner*—Everette A. Powell, Jr.

[57] ABSTRACT

Yaw track means for fluid impact impellers of a Toroidal Accelerator Rotor Platform (TARP) providing for revolution or yaw motion about a vertical centroidal TARP axis to a plurality of interconnected impact impellers supported and guided on said track means within the TARP's peripheral fluid flow augmentor channel. Said impact impellers, which may provide shaft output to electric generators, may actuate the yawing motion on said track means from a steady state position via differential forces acting upon said impellers, from directionally shifting flow impacting a TARP. Impeller yaw response motion will subsequently vector said impellers on said track means into a new steady state and impeller thrust force-balanced position within the TARP peripheral flow field for best energy recovery and energy extraction from said flow field.

10 Claims, 4 Drawing Figures

TARP YAW TRACK MEANS FOR ROTORS

BACKGROUND OF THE INVENTION

This application is a continuation-in-part application of the *Toroidal Accelerator Rotor Platform*, Ser. No. 763,936 filed 2/25/77. The latter application has subsequently been issued U.S. Pat. No. 4,156,579 as of May 29, 1979.

Flow energy extraction and conversion using impellers, as in rotor-generator systems, may be enhanced by means of artificial augmentation of ambient flow to said impellers. Several structural schemes for artificial flow augmentation have been conceived and proposed. These include ducted diffusers, vertical cylinders with aperture controlled slot perforated walls for vortex induction, and wing surfaces inclined at angle of attack to flow to induce vortices off their leading edge and tips. To accomodate energy recovery via impellers in each of the latter concepts requires that either the entire structure be yawed into the flow, as is the case with ducts and wing surfaces, or that aperture size be controlled with numerous shutter mechanisms as is the case with vertical vortex inducing cylinders or towers.

Large structure yaw in response to flow direction shift may require large and expensive bearings and perhaps auxiliary power to actuate yaw motion. Vortex flow control through cylinder wall apertures may require complex and costly actuation and control systems with substantial parasite auxiliary power requirements.

A TARP, being an omnidirectionally symmetric flow augmentation structure having high compatibility with numerous common base structures, may accomplish interconnected impeller system yaw simply in response to shifting flow direction for best energy recovery by allowing said interconnected impellers to track within the TARP's peripheral flow channel on a track means substantially concentric with the TARP peripheral channel. Interconnected impeller yaw motion may be activated by an unequal force couple acting on the interconnected impellers as result of flow directional reorientation away from an initial impeller thrust force-balanced steady state position. Because the plural interconnected impellers, generally two, seek a thrust force balance, they automatically yaw as a unit within the TARP peripheral channel flow field into position for best energy recovery therein. Said impeller system yaw may further be enhanced by interconnecting with said interconnected impellers a drag means or blockage means which may impede flow both in the TARP peripheral flow channel and, through extension, beyond the channel realm.

It is thus an object of the present invention to provide a simple and effective yaw response capability by TARP for an interconnected impeller system in response to flow direction reorientation to said impellers acting within a TARP's peripheral flow channel on track means substantially concentric with the peripheral flow channel.

SUMMARY OF THE INVENTION

In accordance with the present invention, the TARP, being a flow augmentor structure having energy conversion system applicability and mission oriented adaptability to numerous common base structures, provides for interconnected impellers a yaw track means within the TARP peripheral flow channel, said track means being substantially concentric to the TARP peripheral flow channel.

DESCRIPTION

Figure 1:
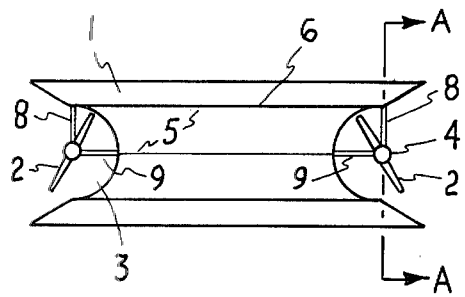
FIG. 1 is a front view of a TARP embodying the invention.
Figure 2:
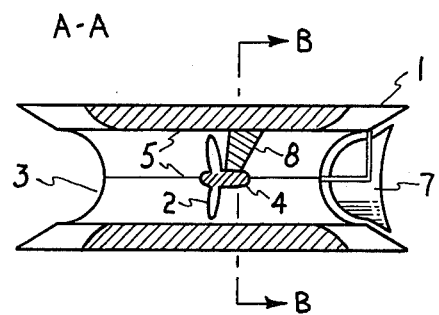
FIG. 2 is a sectional view taken along the line A—A in FIG. 1.
Figure 3:
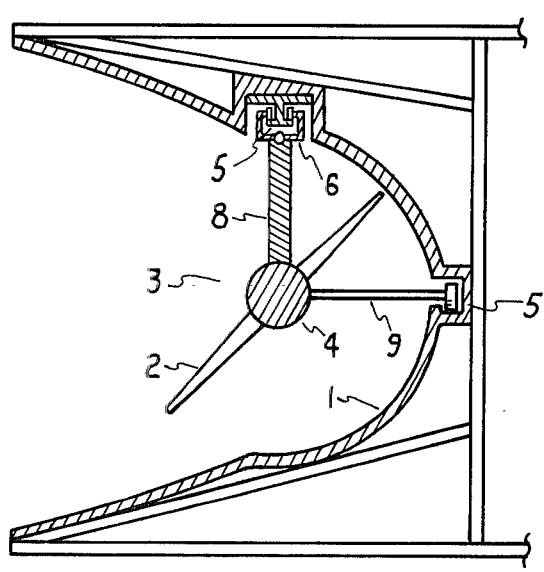
FIG. 3 is a fragmentary sectional view taken along the line B—B in FIG. 2.
Figure 4:
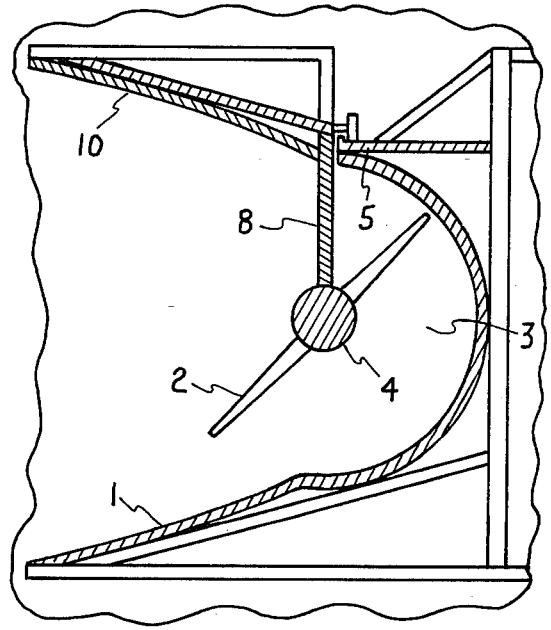
FIG. 4 is a fragmentary sectional view similar to that of FIG. 3 of a modified form of the invention.

Referring to FIG. 1 and FIG. 2, a TARP, 1 embodying the invention is illustrated incorporating interconnected rotatable fluid impact impellers 2 within fluid flow channel means 3 about the periphery of said TARP 1 and said interconnected impellers 2, illustrated connected to generators 4, and said impellers supported and guided by substantially wheel-like, bearing-like, fluid-cushion-like or electromagnetic-like action on yaw track means 5 being substantially concentric with the peripheral channel of TARP and impellers being interconnected by linking means 6. Yaw enhancement drag or blockage means 7, being illustrated interconnected and supported on track means 5 with impellers 2 and substantially located peripheral to TARP structure. Referring to FIG. 3 track means 5 is sectionally illustrated and fluid impact impeller 2 is illustrated supported on track means 5 by support means 8 and retention and stabilization support means 9. Yaw motion by interconnected impellers 2 on track means 5 may be initiated by fluid flow about TARP in channel means 3 exerting a thrust force on impellers 2. As shown in FIG. 4, interconnected impeller yaw can also be achieved by having a fractional detached structural member 10, of a TARP 1 and being substantially concentric to the TARP peripheral channel means 3 with impellers 2 affixed via support means 8 to said member 10, supported on track means 5 mounted to the remainder of the TARP flow augmentor structure 1. Many modifications, embodiments, and changes will be evident, as for example specific track and tracking means type (i.e. wheeled, bearing, electro-magnetic, fluid cushioned, etc.), shape, location and number integrated into a TARP for interconnected impeller system yaw response to fluid flow directional shift, while still remaining within the scope and spirit of the invention.

What I claim is:

1. A power generating device comprising:
a fluid flow velocity augmentor structure means being substantially the shape of a concentric interior section of a hollow toroid of general arbitrary cross-section in both vertical and horizontal planes, meaning that in both a vertical and horizontal plane cross-sections may not be limited to circular arc and circular sections respectively, providing thereby open peripheral fluid flow channel means and defining augmented flow velocity regions about the exterior periphery of said fluid flow augmentor structure wherein a plurality of interconnected fluid impact impellers are mounted within said peripheral fluid flow channel; Track means, mounted on the fluid flow augmentor structure substantially concentric to the peripheral fluid flow channel, with said interconnected fluid impact impellers mounted for yaw upon track means within the peripheral fluid flow channel for tracking and maintaining alignment with shifting flow augmentation fields relative to flow augmentation structure in response to change in ambient flow direction.

2. A power generating device according to claim 1 wherein said track means is comprised of rails and/or channels wherein impact impellers are guided, supported and may yaw upon said rails and channels by wheel-like devices.

3. A power generating device according to claim 2 wherein the fluid flow augmentor has substantially horizontally circular peripheral channel means and wherein impact impellers are two horizontal axis rotors.

4. A power generating device according to claim 1 wherein said track means is comprised of bearing-like structures with impact impellers mounted upon said track means for yaw.

5. A power generating device according to claim 4 wherein the fluid flow augmentor has substantially horizontally circular peripheral channel means and wherein impact impellers are two interconnected horizontal axis rotors.

6. A power generating device according to claim 1 wherein said track means is comprised of rails and/or channels and wherein impact impellers are mounted, guided, and yaw on said track means by fluid cushion action.

7. A power generating device according to claim 6 wherein the fluid flow augmentor has substantially horizontally circular peripheral channel means and wherein impact impellers are two horizontal axis rotors.

8. A power generating device according to claim 1 wherein the track means is comprised of rails and/or channels and wherein impact impellers are mounted, guided, and may yaw on said track means by electromagnetic action.

9. A power generating device according to claim 1 wherein said fluid flow augmentor is comprised of two horizontally split sections and having one said section, with impact impellers mounted to it, mounted upon track means affixed to said remaining section to allow yaw motion together with impact impellers being within the fluid flow augmentor peripheral channel.

10. A power generating device according to claim 9 wherein the fluid flow augmentor has substantially horizontally circular peripheral channel means and wherein impact impellers are two horizontal axis rotors.

* * * * *